(12) United States Patent
Waller et al.

(10) Patent No.: US 6,648,349 B1
(45) Date of Patent: Nov. 18, 2003

(54) MULTI-PURPOSE CART

(76) Inventors: Melissa J. Waller, 7618 Vine St., Land O'Lakes, FL (US) 34639; Gloria Ann Carey, 6552 Westshore, Cir., Tampa, FL (US) 33616

( * ) Notice: Subject to any disclaimer, the term of this patent is extended or adjusted under 35 U.S.C. 154(b) by 0 days.

(21) Appl. No.: 10/061,096

(22) Filed: Feb. 1, 2002

(51) Int. Cl.⁷ .............................. B62B 11/00; B62B 3/00
(52) U.S. Cl. .................................. 280/47.35; 280/79.2
(58) Field of Search ............................. 62/457.1, 457.7; 280/30, 47.34, 47.35, 47.26, 79.11, 79.2

(56) References Cited

U.S. PATENT DOCUMENTS

| | | | | |
|---|---|---|---|---|
| 1,080,551 A | * | 12/1913 | Hartwell | 62/457.7 |
| 2,034,472 A | * | 3/1936 | Kesslinger | 62/457.7 |
| 2,604,333 A | * | 7/1952 | Elmer | 280/47.34 |
| 4,873,841 A | * | 10/1989 | Bradshaw et al. | 62/457.7 |
| 4,916,923 A | * | 4/1990 | Adams et al. | 62/457.1 |
| 4,974,426 A | * | 12/1990 | Gomez et al. | 62/457.7 |
| 5,407,218 A | * | 4/1995 | Jackson | 280/30 |
| 5,480,170 A | * | 1/1996 | Kaiser, II | 280/30 |
| 5,704,496 A | * | 1/1998 | Latta | 211/70.6 |
| 6,357,252 B1 | * | 3/2002 | Rand | 62/457.7 |

* cited by examiner

Primary Examiner—Frank Bennett Vanaman

(57) ABSTRACT

The present invention is a multi-purpose cart apparatus that allows the user to store and safely transport a plurality of items onto the cart while simultaneously allowing the user to easily gain access to any of these items as well as making available a relatively large flat surface to be used as a table top surface. The cart body comprises a substantially rectangular box like design wherein a plurality of holders are mounted onto the outside surfaces of the side walls, and having a top cover which makes available a flat working surface composed of two lids pivotally hinged to a central spine traversing opposing sides of the box. Attached to the cart body are wheels and a tow bar for maneuvering the cart.

3 Claims, 3 Drawing Sheets

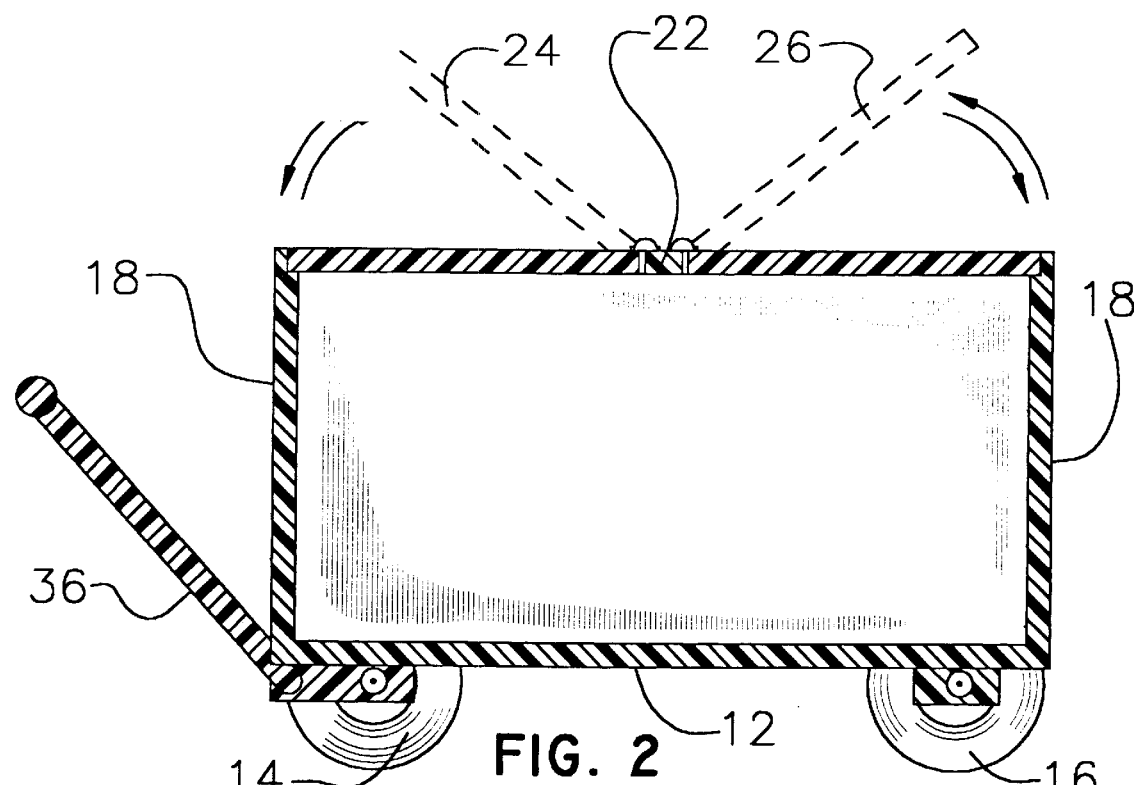
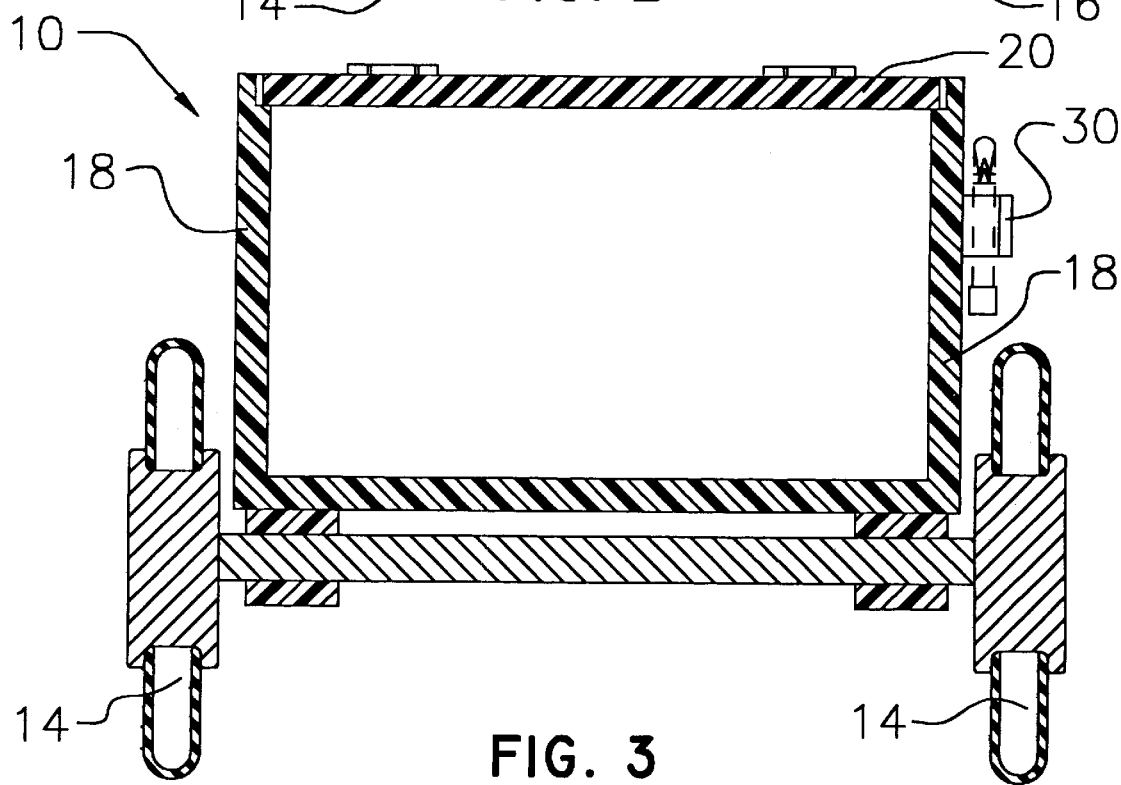

MULTI-PURPOSE CART

BACKGROUND OF THE INVENTION

1. Field of the Invention

The present invention relates to utility carts, and more particularly pertains to a multi-purpose utility cart that can store and safely transport a plurality of items which allows the user to easily gain access to these items and which also makes available a flat work space.

2. Description of the Prior Art

Many people enjoy recreational activities. However, many of these recreational activities seem to require that various accessories must be brought along so that one can further enhance that particular recreational activity being enjoyed. One common experience shared by nearly everyone is the recreational activity of spending a day at the beach. Many that do enjoy a day at the beach seem to bring with them all sorts of accessory items. Some of these beach accessories usually include beach towels, paperback books, extra dry clothes, umbrellas, coolers filled with food and drinks, suntan lotion, etc. The burden of transporting all of these accessories to the beach can quickly become an unenjoyable task when more than one trip is required. Furthermore, it is often assumed that the task of transporting all of these accessories usually requires that none of these items are to be damaged in anyway during this transportation process. For example, it is usually assumed that suntan lotion is not to be spilled or leaked onto clean dry clothes or onto any one of the paperback books. Conventional prior art solutions used to accomplish this task of transporting these types of accessories are the use of bags, backpacks and even utility carts. One common disadvantage shared with nearly all of these conventional prior art solutions is that the accessories are not conveniently stored in an organized manner. This lack of organized storage in the conventional prior art solutions is likely to prevent the user from gaining quick access to any one of these accessories. As a consequence of the absence of organized storage, the user must resort in rooting through this common hodgepodge collection until the user happens upon the particular desired accessory. This common disadvantage of a lack of organized storage is that it may also lead to another commonly shared disadvantage. That is, the use of these conventional prior art strategies that allow storage of all of the accessories in a common compartment may lead to an increase in the chances of damaging or even breaking any fragile accessories. Furthermore, as a result of any breakage, contamination from the contents of any of the broken accessories onto the other non broken accessories, as well as, contamination of the common storage area is enhanced. Still yet another disadvantage with the use of these conventional prior art strategies is that they may be difficult to clean or to decontaminate. Yet another disadvantage shared by these conventional prior art strategies in transporting accessories is that non offer a stable workspace to work on.

These common problems experienced in safely transporting, organizing, and accessing various items are not exclusively experienced in recreational activities. For example, when a gardener initiates a particular gardening project, the gardener must decide which particular items are required to accomplish that particular chosen gardening project. Some of these gardening items which a gardener would likely require in order to accomplish any given gardening project would include items such as tools, equipment, accessories and gardening chemicals. Many lawn and garden projects also require the use of bulk materials such as mulch, manure, seed and transplanted plants to that they must be hauled to the site. Therefore, the gardener must make several trips back-and-forth to gather these items. Depending upon the projected duration of the project, the gardener may also include refreshments, such as food and beverages to be included in the list of items to be taken to the gardening project.

As a result of initiating a garden project, a gardener must round up a wide variety of items from their various respective storage sites and eventually transport this diverse collection of items to the particular garden project work site. Some of the common gardening tools likely to be required by a gardener would include shovels, hoes, rakes, shears, hoses, electrical cords, trimmers, gloves etc. Some of the common pieces of gardening equipment likely to be required by a gardener would include items such as planting pots, potted plants, seedling racks, and watering cans. Some of the common gardening accessories that a gardener may wish to transport to a project site are potting soil, mulch or manure. Some of the common gardening chemicals that a gardener may wish to transport to a project site are various chemical fertilizers, herbicides, pesticides and various poisons, such as gopher poisons. Since many of these common gardening chemicals are hazardous, the gardener is likely to desire that these chemicals are to be safely sequestered so that they do not subsequently contaminate the gardener himself, nor contaminate his tools, equipment, accessories or refreshments.

Furthermore, as a result of completing a given garden project, a gardener is likely to gather up any garden refuse such as weeds, grass, limbs and litter to be cleaned up. Moving the garden refuse from the project site to a storage or disposal site is likely to require additional time, as well as equipment and supplies such as trash containers, lawn bags or a wheelbarrow. The conventional prior art solution has been that when the project is completed, all of the tools and equipment must be moved back to the storage facility and put away. Some pieces of equipment, such as rakes and shovels are stored on wall racks or just stacked against a wall. Some paraphernalia, such as gloves, and tools or small pots, may be placed on a shelf or stored in a drawer. In any event, the conventional prior art strategy has been largely to return each tool or item back to their respective storage sites after the project is complete.

Conventional carts have rectangular bodies with four walls configured to carry items and materials therein. A set of wheels rollingly supports the conventional cart. A handle is typically provided so that the cart can be rolled manually by pulling on the handle. It is also commonly known to rotatably mount the front wheels on an axle that is rotatably mounted to the bottom of the cart body. The handle is then mounted to the axle and the cart can be steered by pulling the handle in any desired steering direction, thereby rotating the front axle and aligning the front wheels in that direction. The conventional cart, however, presents a number of problems and shortcomings.

Conventional carts fail to provide a means for organizing the various accessories transported by these carts so that the user may conveniently and safely gain access to each accessory. Carts often have little more than one open chamber where all of the items to be transported are placed, and as a result cross contamination is likely to occur. For example, dirt from shovels may contaminate clean gloves when both are stored in the common chamber. A more serious problem may occur in the event that a garden chemical container breaks and subsequently contaminates the cart and its contents with the hazardous chemical.

Conventional carts also fail to provide a convenient means for decontaminating or cleaning the cart other than the means of flooding the storage chamber with soap and water and turning the cart upside down so that the cart may drain.

Conventional carts also fail to provide an adequate surface on which a user can arrange and manipulate certain items and materials. Working in the field or the garden, the gardener often needs a flat work area so that the he may perform a number of chores such as preparing seeds, seedling and potted plants for transplantation. In addition, a modern gardener is likely to need a flat work area so that the gardener may safely handle and manipulate the mixing of various garden chemicals. The conventional prior art strategies have been typically to allow the gardener to lay them these items directly onto ground and subsequently manipulate them on the ground. This conventional prior art strategy provides a number of undesirable results such as enhancing the opportunity for gardener to lose those items placed on the ground, as well as creating an unacceptable environmental or health risk due to the possibility of accidental spillage of various gardening chemicals.

It is appreciated that much of the time dedicated to completing a particular project, such as a yard or garden project is spent in handling tools, equipment and garden chemicals. A number of yard carts capable of holding and transporting lawn and garden tools are known. A number of these carts allow the user to load tools on the cart and move them to the project site. Some of the carts serve to move bulk material to the site or more the refuse from the project site to a storage or disposal site. However, the prior art carts all have significant limitations, as will be discussed hereinafter.

By way of example, the cooler caddy disclosed by Kaiser in U.S. Pat. No. 5,480,170 discloses a device for transporting food and related items having foldable all-terrain wheels, foldable tray members and telescoping handle. The saddlebag provides and increased transporting capacity. However, the coller caddy disclosed by Kaiser has no drain plug for use in decontamination purposes, nor does it have a plurality of grips capable of organizing items along the walls of the caddy. In addition, the Kaiser disclosure have a top member which can be opened to access a contaminant free zone.

The beach cart disclosed by Crowell in U.S. Pat. No. 5,857,695 discloses a collapsible caddy that converts into a table when collapsed and has wheels adaped to pavement and sand. However, the beach cart disclosed by Crowell does not have a drain plug for use in decontamination purposes, nor does it have a plurality of grips capable of organizing items along the walls of the caddy. In addition, the Crowell disclosure uses a top member that can be opened to access a contaminant-free zone.

The utility cart disclosed by Dennis in U.S. Pat. No. 5,876,047 discloses a cart frame fitted with an ice chest receptacle with double hinged lids and lid covers and a storage compartment located adjacent to the ice chest. However, the utility cart disclosed by Dennis has no drain plug for use in decontamination purposes, nor does it have a plurality of grips capable of organizing items along the walls of the caddy.

The modular tool rack system disclosed by Latta in U.S. Pat. No. 5,704,496 discloses a modular system of racks for mounting on a wheeled container to convert the wheeled container into a tool-bearing yard and garden cart. However, the modular tool rack system disclosed by Latta does not have a drain plug for use in decontamination purposes, nor does it have a top member which can be opened to access a contaminant free zone.

From the above discussion it is apparent that none of the prior art carts addresses all of the plurality of needs that might be encountered when using a multi-purpose cart, such as the various needs associated with groundskeepers or gardeners. For example, none of these devices holds and transports, at the same time, all of the types of conventional tools, equipment, accessories and gardening chemicals in a safe and convenient manner. Therefore, the user is forced to make multiple trips away from the project site to gather tools and equipment. In addition, none of these devices make available a means of safely manipulating hazardous chemicals at a substantially flat table top or by making available a means of safely decontaminating the cart in the event that the cart and its accessories become contaminated.

Accordingly, it is an advantage of the present invention to provide a cart assembly having a working surface that allows a user to safely arrange items and materials used on a substantially flat the working surface.

It is another advantage of the present invention to provide a cart assembly having a plurality of clamping means for attaching tools and equipment onto the outside and inside walls of the cart so that the tools and equipment may be stored and organized in a safe manner.

It is yet another advantage of the present invention to provide a cart assembly having a substantially flat working surface that allows access to at least one storage compartment below the working surface.

The handle structure is constructed and arranged such that the cart assembly can be rolled manually by exerting force on the handle structure. The cart body structure is constructed and arranged to provide one or more storage compartments. The one or more storage compartments are constructed and arranged to accommodate the carriage of items and materials, such as gardening and lawn care tools, chemicals and transplanted plants. Thereby allowing certain items and materials to be carried separately from the items and materials carried in the main compartment and allowing access to those certain items and material in a convenient mode.

The cart structures are constructed and arranged to enable the cart assembly to be rolled manually exerting force upon the handle structure in the operating positions.

Therefore, it can be appreciated that there exist a continuing need for new and improved multi-purpose cart. In this regard, the present invention substantially fulfills this need.

SUMMARY OF THE INVENTION

In view of the foregoing disadvantages inherent in the known type of carts now present in the prior art, the present invention provides and improved multi-purpose cart wherein the same can be utilized for storing and safely transporting a plurality of items which allows the user to easily gain access to these items and which also makes available to the user a flat work space. As such, the general purpose of the present invention, which will be described subsequently in great detail, is to provide a new and improved multi-purpose cart which has all the advantages of the prior art carts and none of the disadvantages.

To attain this, the present invention essentially comprises a multi-purpose cart having a substantially rectangular base member having a length, a width, a forward end and a rearward end, wherein the width is less than the length; two front wheels rotatably attached to the bottom side of the forward end of the substantially rectangular base member; two rear wheels rotatably attached to the bottom side of the rearward end of the substantially rectangular base member; four sides walls connected to the substantially rectangular base member forming a substantially box like body wherein creating a sequestered storage zone; a rubber strip seal attached to each of the top edges of the four side walls; a table top having a center spine attached at substantially to the middle top portions of two opposing sides of the four sides, a forward lid pivotally hinged to the center spine, wherein the forward lid is movable to a closed position where the forward lid is substantially coplanar with the substantially rectangular base member, and wherein the forward lid is movable to an open position where the forward lid is substantially perpendicular to the substantially rectangular base member, and a rearward lid pivotally hinged to the center spine, wherein the rearward lid is movable to a closed position where the rearward lid is substantially coplanar with the substantially rectangular base member, and wherein the rearward lid is movable to an open position where the forward lid is substantially perpendicular to the substantially rectangular base member, wherein the top surface of the table top forms a substantially planar surface when the forward and rearward panels are substantially planar to the substantially rectangular base for providing a flat working area, and wherein the sequestered storage zone is substantially sealed from the outside environment when the forward and rearward lids are in the closed positions and contacting the rubber seal for preventing any unwanted external material from entering into the sequestered storage zone; a drain plug attached to the substantially rectangular base member, wherein the drain plug for allowing drainage of material from the storage zone when the drain plug is removed from the substantially rectangular base member; a first plurality of tool holders attached to the outside surface of one of the four side walls; a first box attached to the outside surface of one of the four side walls, wherein the first box having cap pivotally attached to the top of the first box for allowing access within the first box; a first cold drink holder attached to an outside surface of one of the four side walls for holding a cold drink; and a tow bar attached to the bottom front end of the substantially rectangular base member for towing the multi-purpose cart.

There has thus been outlined, rather broadly, the more important features of the invention in order that the detailed description thereof that follows may be better understood, and in order that the present contribution of the art may be better appreciated. There are of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The inveniton is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an advantage of the present invention to provide a new and improved multi-purpose cart which has all the advantages of the prior art carts and none of the disadvantages.

These together with other advantages of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompany drawings and description matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 2 is a length wise cross sectional cutaway view of the multi-purpose cart.

FIG. 3 is a width wise cross sectional cutaway view of the multi-purpose cart.

DETAILED DESCRIPTION OF THE PREFERRED EMBODIMENT

Figure 1:
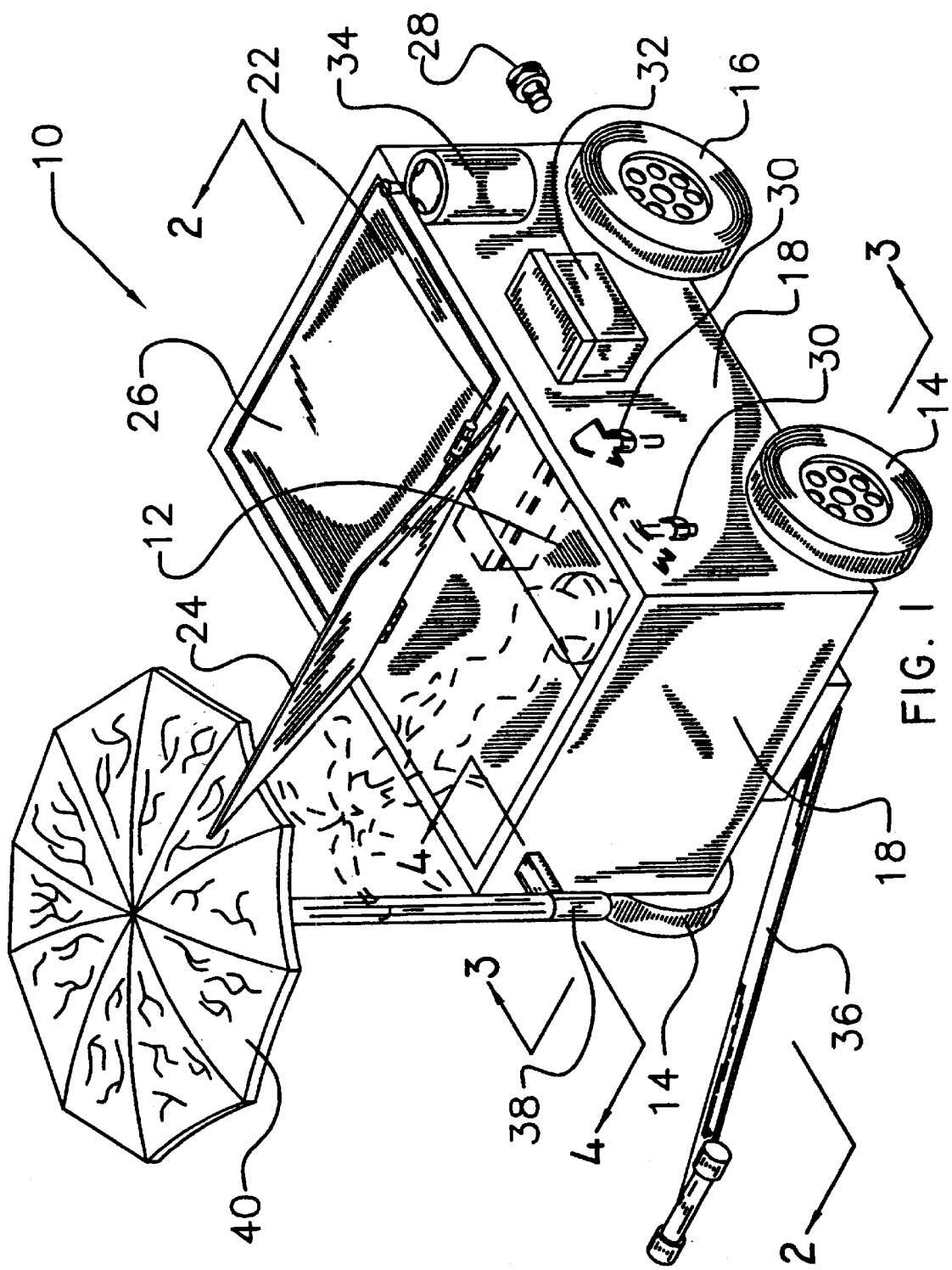
FIG. 1 is a perspective view of the multi-purpose cart.
Figure 4:
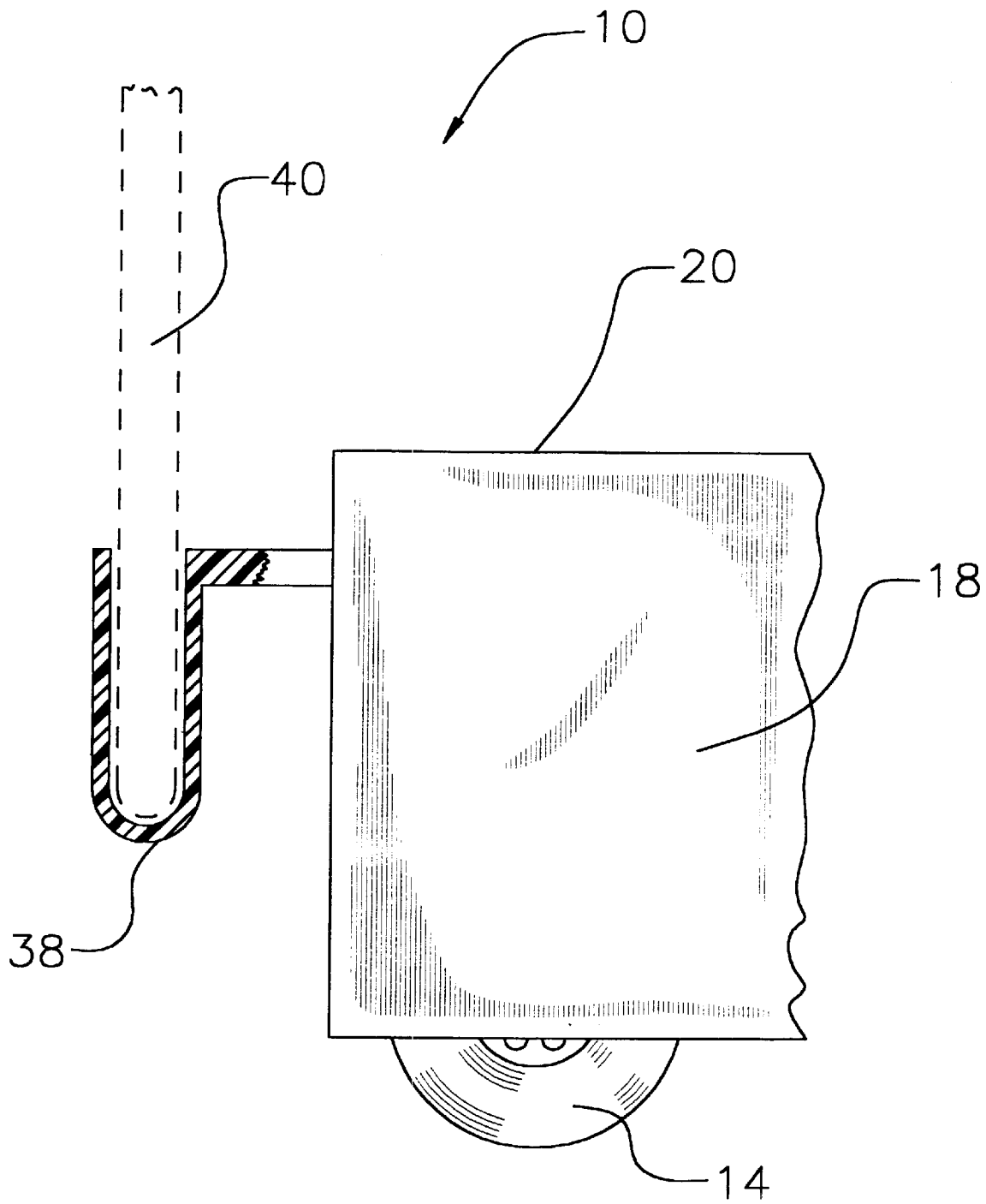
FIG. 4 is a partial view of the multi-purpose cart illustrating an umbrella bracket.

With reference not to the drawings, and in particular FIGS. 1 to 4 thereof one preferred embodiment of the present invention of the multi-purpose cart 10 comprises: a substantially rectangular base member 12 having a length, a width, a forward end and a rearward end, wherein the width is less than the length; two front wheels 14 rotatably attached to the bottom side of the forward end of the substantially rectangular base member 12; two rear wheels 16 rotatably attached to the bottom side of the rearward end of the substantially rectangular base member 12; four side walls 18 connected to the substantially rectangular base member 12 forming a substantially box like body wherein creating a sequestered storage zone; a rubber strip seal (not shown) attached to each of the top edges of the four side walls 18; a table top 20 having a center spine 22 attached at substantially to the middle top portions of two opposing sides of the four side walls 18, a forward lid 24 pivotally hinged to the center spine 22, wherein the forward lid 24 is movable to a closed position where the forward lid 24 is substantially coplanar with the substantially rectangular base member 12, and wherein the forward lid 24 is movable to an open position where the forward lid 24 is substantially perpendicular to the substantially rectangular base member 12, and a rearward lid 26 pivotally hinged to the center spine 22, wherein the rearward lid 26 is movable to a closed position where the rearward lid 26 is substantially coplanar with the substantially rectangular base member 12, and wherein the rearward lid 26 is movable to an open position where the forward lid 24 is substantially perpendicular to the substantially rectangular base member 12, wherein the top surface of the table top 20 forms a substantially planar surface when the forward and rearward panels are substantially planar to the substantially rectangular base for providing a flat working area, and wherein the sequestered storage zone is substantially sealed from the outside environment when the forward and rearward lid 26s are in the closed positions and contacting the rubber seal for preventing any unwanted external material from entering into the sequestered storage zone; a drain plug 28 attached to the substantially rectangular base member 12, wherein the drain plug 28 for allowing drainage of material from the storage zone when the drain plug 28 is removed from the substantially rectangular base member 12; a first plurality of tool holders 30 attached to the outside surface of one of the four side walls 18; a first box 32 attached to the outside surface of one of the four side walls 18, wherein the first box 32 having cap pivotally attached to the top of the first box 32 for allowing access within the first box 32; a first cold drink holder 34 attached to an outside surface of one of the four side walls 18 for holding a cold drink; a tow bar 36 attached to the bottom front end of the substantially rectangular base member 12 for towing the multi-purpose cart 10; and an umbrella bracket 38 means attached to one of the four side walls 18 for removably receiving and supporting at least one umbrella 40.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A multi-purpose cart comprising:
    a substantially rectangular base member having a length, a width, a forward end and a rearward end, wherein the width is less than the length;
    two front wheels rotatably attached to the bottom side of the forward end of the substantially rectangular base member;
    two rear wheels rotatably attached to the bottom side of the rearward end of the substantially rectangular base member;
    four side walls connected to said substantially rectangular base member;
    a table top having
        a center spine attached at substantially to the middle top portions of two opposing sides of said four sides,
        a forward lid pivotally hinged to said center spine,
            wherein said forward lid is movable to a closed position when said forward lid is substantially parallel with said substantially rectangular base member, and
            wherein said forward lid is movable to an open position when said forward lid is substantially perpendicular to said substantially rectangular base member, and
        a rearward lid pivotally hinged to said center spine,
            wherein said rearward lid is movable to a closed position when said rearward lid is substantially parallel with said substantially rectangular base member, and
            wherein said rearward lid is movable to an open position when said forward lid is substantially perpendicular to said substantially rectangular base member,
            wherein the top surface of said table top forms a substantially planar surface when said forward and rearward lids are substantially parallel to said substantially rectangular base for providing a flat working area, and
            wherein the sequestered storage zone is substantially sealed from the outside environment when said forward and rearward lids are in the closed positions for preventing any unwanted external material from entering into the sequestered storage zone;
    a drain plug attached to the substantially rectangular base member,
        wherein said drain plug for allowing drainage of material from the storage zone when said drain plug is removed from said substantially rectangular base member; a first plurality of tool holders attached to the outside surface of one of said four side walls, each tool holder of said first plurality of tool holders comprises a rigid collar shaped structure defining an orifice between said tool holder and said one of said four side walls, wherein said orifice capable of slidably accepting a tool handle of a hand tool and said rigid collar shaped structure capable of suspending the hand tool from said multi-purpose cart; a first box attached to the outside surface of one of said four side walls,
        wherein said first box having a cap pivotally attached to the top of said first box for allowing access within said first box;
    a first cold drink holder attached to an outside surface of one of said four side walls for holding a cold drink; and
    a tow bar attached to the bottom front end of said substantially rectangular base member for towing said multi-purpose cart.

2. The multi-purpose cart described in claim 1, further comprising an umbrella bracket attached to one of the sides of said cart for removably receiving and supporting at least one umbrella.

3. A multi-purpose cart comprising:
    a substantially rectangular base member having a length, a width, a forward end and a rearward end, wherein the width is less than the length;
    two front wheels rotatably attached to the bottom side of the forward end of the substantially rectangular base member;

two rear wheels rotatably attached to the bottom side of the rearward end of the substantially rectangular base member;

four side walls connected to said substantially rectangular base member;

a table top having
- a center spine attached at substantially to the middle top portions of two opposing sides of said four sides,
- a forward lid pivotally hinged to said center spine, wherein said forward lid is movable to a closed position when said forward lid is substantially parallel with said substantially rectangular base member, and wherein said forward lid is movable to an open position when said forward lid is substantially perpendicular to said substantially rectangular base member, and a rearward lid pivotally hinged to said center spine, wherein said rearward lid is movable to a closed position when said rearward lid is substantially parallel with said substantially rectangular base member, and wherein said rearward lid is movable to an open position when said forward lid is substantially perpendicular to said substantially rectangular base member, wherein the top surface of said table top forms a substantially planar surface when said forward and rearward lids are substantially parallel to said substantially rectangular base for providing a flat working area, and wherein the sequestered storage zone is substantially sealed from the outside environment when said forward and rearward lids are in the closed positions for preventing any unwanted external material from entering into the sequestered storage zone;

a drain plug attached to the substantially rectangular base member, wherein said drain plug for allowing drainage of material from the storage zone when said drain plug is removed from said substantially rectangular base member;

a first plurality of tool holders attached to the outside surface of one of said four side walls, each tool holder of said first plurality of tool holders comprises a rigid collar shaped structure defining an orifice between said tool holder and said one of said four side walls, wherein said orifice capable of slidably accepting a tool handle of a hand tool and said rigid collar shaped structure capable of suspending the hand tool from said multi-purpose cart;

a first box attached to the outside surface of one of said four side walls, wherein said first box having a cap pivotally attached to the top of said first box for allowing access within said first box;

a first cold drink holder attached to an outside surface of one of said four side walls for holding a cold drink;

a tow bar attached to the bottom front end of said substantially rectangular base member for towing said multi-purpose cart;

an umbrella; and an umbrella bracket attached to one of the sides of said cart for removably receiving and supporting said umbrella.

* * * * *